(12) United States Patent
Knoefel et al.

(10) Patent No.: US 9,394,133 B2
(45) Date of Patent: Jul. 19, 2016

(54) DEVICE FOR DELIVERING PRINT SHOP PRODUCTS SUPPLIED IN A PRODUCT STREAM ON TWO SEPARATE STACKS

(71) Applicant: HEIDELBERGER DRUCKMASCHINEN AG, Heidelberg (DE)

(72) Inventors: Jens Knoefel, Brandis (DE); Lutz Richter, Schkeuditz (DE); Frank Sommerer, Leipzig (DE)

(73) Assignee: Mueller Martini Holding AG, Zofingen (CH)

( * ) Notice: Subject to any disclaimer, the term of this patent is extended or adjusted under 35 U.S.C. 154(b) by 23 days.

(21) Appl. No.: 14/183,736

(22) Filed: Feb. 19, 2014

(65) Prior Publication Data

US 2014/0234067 A1    Aug. 21, 2014

(30) Foreign Application Priority Data

Feb. 19, 2013   (DE) .......................... 10 2013 002 754

(51) Int. Cl.
| | |
|---|---|
| *B65G 21/14* | (2006.01) |
| *B65H 31/24* | (2006.01) |
| *B65H 29/18* | (2006.01) |

(Continued)

(52) U.S. Cl.
CPC ............... *B65H 29/38* (2013.01); *B65H 29/18* (2013.01); *B65H 31/10* (2013.01); *B65H 31/24* (2013.01); *B65G 21/14* (2013.01); *B65H 2301/42264* (2013.01); *B65H 2301/42266* (2013.01); *B65H 2404/1544* (2013.01);

(Continued)

(58) Field of Classification Search
CPC ........ B65G 21/14; B65G 57/11; B65H 29/18; B65H 31/24
USPC ............ 198/369.7, 588, 594, 812; 270/30.01, 270/30.11, 30.12; 271/191, 84; 414/789.9, 414/790.9, 793.4, 793.5, 793.6, 793.7, 414/794.4, 794.7
See application file for complete search history.

(56) References Cited

U.S. PATENT DOCUMENTS 3,556,280 A * 1/1971 Schnee et al. ................. 198/431
D233,545 S  11/1974 Johns
(Continued)

FOREIGN PATENT DOCUMENTS

| CH | 663385 A5 | 12/1987 |
|---|---|---|
| DE | 19628129 B4 | 10/2004 |

(Continued)

*Primary Examiner* — Gregory Adams
(74) *Attorney, Agent, or Firm* — Laurence A. Greenberg; Werner H. Stemer; Ralph E. Locher

(57) ABSTRACT

A device for delivering print shop products supplied in a product stream in two separate stacks contains a transport belt on which the print shop products are deposited, a first deflection roller, a second deflection roller arranged in an horizontal plane with the first deflection roller, a third deflection roller arranged below the second deflection roller, and a stationary fourth deflection roller arranged below the third deflection roller and guiding the transport belt. An actuator jointly moves the second and third deflection rollers in parallel with a horizontal plane from a first delivery position, in which the print shop products are transported to a first stop, into a second delivery position, in which the print shop products are transported to a further stop. First and second first adjustment devices change a distance between the bottom of the respective first and second product receiving spaces and the horizontal plane.

13 Claims, 5 Drawing Sheets

(51) Int. Cl.
   *B65G 57/11* (2006.01)
   *B65H 29/38* (2006.01)
   *B65H 31/10* (2006.01)

(52) U.S. Cl.
   CPC .. *B65H 2404/254* (2013.01); *B65H 2404/2693* (2013.01); *B65H 2511/10* (2013.01); *B65H 2511/20* (2013.01)

(56) References Cited

U.S. PATENT DOCUMENTS

| | | | | |
|---|---|---|---|---|
| 4,050,591 A | * | 9/1977 | Dunlap | 414/790 |
| 4,137,604 A | * | 2/1979 | Sandberg et al. | 99/450.1 |
| 4,151,906 A | * | 5/1979 | Pfeiffer et al. | 198/418.3 |
| 4,155,441 A | * | 5/1979 | Albrecht et al. | 198/419.2 |
| 4,652,198 A | | 3/1987 | Geiser | |
| 5,555,968 A | | 9/1996 | Seefeldt et al. | |
| 5,619,310 A | * | 4/1997 | Todome | 399/381 |
| 5,961,274 A | * | 10/1999 | Bors | 414/791 |
| 6,497,549 B2 | * | 12/2002 | Brown | 414/790.3 |
| 7,021,450 B2 | * | 4/2006 | Jones, Jr. | 198/462.1 |
| 7,413,070 B2 | * | 8/2008 | Mayer | 198/431 |
| 7,699,578 B2 | * | 4/2010 | Nielsen | 414/793.8 |
| 2011/0062000 A1 | * | 3/2011 | Yamamoto | 198/789 |

FOREIGN PATENT DOCUMENTS

| | | | |
|---|---|---|---|
| DE | 19628128 B4 | 8/2005 | |
| EP | 0638502 A2 | 2/1995 | |
| EP | 1155998 A1 * | 11/2001 | B65G 21/14 |
| JP | H0218448 U | 2/1990 | |
| NL | 8603162 A | 7/1998 | |

* cited by examiner

DEVICE FOR DELIVERING PRINT SHOP PRODUCTS SUPPLIED IN A PRODUCT STREAM ON TWO SEPARATE STACKS

CROSS-REFERENCE TO RELATED APPLICATION

This application claims the priority, under 35 U.S.C. §119, of German application DE 10 2013 002 754.3, filed Feb. 19, 2013; the prior application is herewith incorporated by reference in its entirety.

BACKGROUND OF THE INVENTION

Field of the Invention

The invention relates to a device for delivering print shop products, in particular book blocks or books, that are supplied in a stream of products, on two separate stacks.

U.S. design patent DD 233545 A1, Swiss patent CH 663385 A5 (corresponding to U.S. Pat. No. 4,652,198), German patent DE 19628128 B4 and German patent DE 19628129 B4 disclose compensating stackers and book block stackers that are provided downstream of a bindery machine in the production of print shop products provided in a continuous stream of products. The aforementioned documents do not provide information on the delivery of print shop products of different formats in multiple separate stacks during an ongoing production run. In addition, the devices disclosed in the aforementioned documents do not allow a change of format settings during an ongoing production run.

In addition, the aforementioned compensation stackers and book block stackers are comparatively complex in terms of technology as well as prone to failures and expensive due to the fact that they include parts moving in accordance with the cycle of the machine. Consequently, they are mainly used in connection with high-performance print shop machinery which is generally too expensive for small-run producers.

A further problem of the aforementioned compensation stackers and book block stackers is that they may not be simultaneously used as delivery devices for multiple adhesive binders or to process the products of one or more digital printing machines because a mixed mode of operation involving different print shop products, i.e. print shop products of different formats, is not available due to the fact that switching between different formats during an on-going production is impossible.

SUMMARY OF THE INVENTION

It is accordingly an object of the present invention to provide a device and a method for delivering print shop products that are supplied in a stream of products, in particular book blocks or books, in at least two separate stacks without interrupting the supplied product stream of the print shop products.

In accordance with the invention, a device for delivering print shop products, in particular book blocks or books, supplied in a product stream, onto at least two separate stacks contains an endlessly revolving transport belt on which the print shop products are deposited as a stream of products as they are being supplied. The device further contains a stationary upstream upper deflection roller and a second upper deflection roller arranged downstream of the first upper deflection roller as viewed in the supplying direction of the print shop products. The second upper deflection roller is arranged generally in a horizontal plane with the first deflection roller and is preferably linearly movable relative to the latter in parallel with the horizontal plane. Below the second deflection roller, there is a third deflection roller, which is jointly movable with the second deflection roller and below which there is in turn at least one stationary fourth deflection roller that guides the transport belt.

The device of the invention further contains an actuator such as pneumatic cylinder or an electric actuating drive. Via a traction drive, the actuator acts on the second and third deflection rollers, which are arranged at a fixed distance and are preferably mechanically coupled to each other to jointly move the deflection rollers linearly and in a direction parallel to the horizontal plane, from a first delivery position in which the print shop products are conveyed leading side (in general the book spine since this simplifies the stacking of untrimmed products) first against a first stop arranged above a product receiving space for the first stack, into a second delivery position in which the print shop products of the product stream are conveyed leading side first on the transport belt to a further stop arranged above a further product receiving space for the further stack. The device further contains first and second adjustment devices. The first adjustment device acts on the bottom of the first product receiving space and the second adjustment device acts on the bottom of the second product receiving space to increase the distance between the bottom of the respective product receiving space and the horizontal plane in which the products on the transport belt are conveyed to the product receiving spaces arranged below the transport belt, after or during the introduction of a product and thus to provide space towards the top for a following product.

An advantage of the invention is that the transfer length of the transport belt is adaptable to print shop products of different formats during an ongoing production run. This only requires the second and third deflection rollers to be moved backward or forward by the actuator through a corresponding adjustment path in accordance with the respective format of a print shop product currently to be deposited. In the process, the tension in the transport belt remains unchanged due to the belt guiding system of the invention and the constant distance between the two deflection rollers. It is only the position of the second deflection roller above the first or second product receiving space that is changed. Consequently, the device of the invention allows print shop products of different formats to be supplied in one product stream and to collect them in different stacks. Broadly speaking, using the device of the invention, it is possible to stack a variety of different print shop products that are supplied in one product stream (mixed mode of operation) in a correctly sorted manner.

In contrast, the adaptation of the device of the invention to the thickness of the supplied print shop products is achieved by the first or second adjustment device in that the path through which the bottom of the respective product receiving space that is to receive a next print shop product is to be moved is extended or shortened in accordance with the thickness of the print shop product. This allows print shop products of varying thickness to be alternatingly and gently deposited on one and the same stack without the risk of damage to a product as it is being deposited in the product receiving space due to the fact that there is too great a distance between the upper side of the previously deposited product and the horizontal plane in which the products are supplied on the transport belt. In other words, by lowering the stacking belt in a controlled way, it is possible to react to varying product thicknesses, in particular varying book block thicknesses while the production continues.

A further advantage of the invention is that the belt systems that are used as well as roller systems, which will be described in more detail below, do not cause any relative movements between the products themselves nor between the products and the transporting device.

To control the selection of the desired product receiving space and the lowering of the respective bottoms of the product receiving spaces or stacking tables, the device of the invention preferably contains an electronic control device. Once a print shop product has been introduced into a product receiving space, the electronic control device actuates the actuator and the adjustment devices in such a way that before the next print shop product is introduced, the bottom of the product receiving space is lowered to an extent that essentially corresponds to the thickness of the introduced print shop products.

The electronic control device may be coupled to a sensor and/or a memory that detects and/or has saved the presence of print shop products and the type of print shop product conveyed on the transport belt in particular in the region of the second deflection roller. The products preferably bear information carriers such as bar codes, QR codes, or RFID chips that contain encoded information, in particular information pertaining to the format and/or the thickness of the respective product. The information contained in the information carriers is detected by the corresponding sensor and are supplied to the electronic control device, which controls the actuator and the adjustment devices as a function of the information on a print shop product that is being conveyed on the transport belt and will be the next to be deposited in such a way that the product is deposited in the correct product receiving space, i.e. on the correct product stack.

In accordance with a preferred embodiment of the invention, the second deflection roller and the third deflection roller are received on a common frame, which is movably guided in a stationary guide. The frame may for instance be a box-shaped frame with four outer walls in which the second and third deflection rollers are supported for rotation in the box-shaped frame. The frame is preferably guided by linear guides arranged on both sides between the outer walls of the housing of the device. This results in a particularly smooth and accurate displacement of the two deflection rollers while the spacing between the two deflection rollers remains constant at all times.

A slide plate (which is not illustrated in any detail herein) supporting the transport belt is preferably arranged on the upper side of the frame. This slide plate extends tangentially in the horizontal plane up to the second deflection roller. An advantage of this arrangement is that when the products are being fed to the individual product receiving spaces or stacks, the feeding plane for the product stream is largely kept constant, eliminating the danger of changes in the position of the feeding plane of the products that are being fed as a result of a sagging of the transport belt as a function of the respective weight of a product.

In accordance with a further feature of the invention, one of the movable deflection rollers or one of the stationary deflection rollers is driven by a drive motor, in particular by an electric motor received within the roller and a reduction gearing in order to drive the transport belt that is guided by the roller. Although it is possible to drive another deflection roller, for example the first stationary deflection roller or the third and fourth deflection roller, driving a movable deflection roller has the advantage of allowing the differential speed upon a joint movement of the second and third deflection rollers in the direction towards the second product receiving space to be assisted by a corresponding increase or decrease of the rotational speed and/or of the torque introduced into the transport belt by the second deflection roller. In addition, this provides the option of matching the advancing speed for a movement of the two rollers initiated by the actuator and the circumferential speed of the second deflection roller in a suitable way to reduce slippage between the second deflection roller and the transport belt as much as possible when the two deflection rollers are moved from one delivery position into the other delivery position. In this context in particular, when the second and third deflection rollers are being moved in the direction of the distal second product receiving space, the rotational speed of the second deflection roller may be reduced to such an extent that the surface speed thereof generally corresponds to the feeding speed of the products minus the speed at which the second and third deflection rollers are being displaced by the actuator. This reduces the force for displacing the frame as much as possible.

In accordance with a further embodiment of the invention, a provision may be made for the bottom of the first and/or second product receiving spaces to contain a respective endless transport belt guided by at least two rollers that are arranged in a generally horizontal plane and whose axes of rotation are generally parallel to the conveying direction of the print shop products that are being fed. A slide plate for supporting the print shop products deposited as a stack on the transport belt may preferably be provided between these two rollers. In this case, one of the two rollers may be driven so that a stack that has reached a predetermined stacking height may be moved in a lateral direction out of the product receiving area and onto a further transport belt or a roller track when the other product.

Alternatively, the bottoms of the first and/or second product receiving spaces may each contain a plurality of rollers that are arranged adjacent to each other in a plane and on the upper side of which the print shop products introduced into the respective product receiving area are deposited as a stack. To transfer a stack that has reached a desired stacking height to a downstream conveying device such as a downstream transport belt or an inclined roller track, the first and/or second product receiving spaces preferably are assigned a respective pusher device that is driven by a motor to push the print shop products that have been deposited on top of each other on a stack in the product receiving space in a direction that is generally perpendicular to the conveying direction of the product stream out of the respective product receiving space and onto the further conveying device. To actuate the pusher devices, further actuators, for example hydraulic cylinders, pneumatic cylinders, or electrical actuating drives may be provided, which are likewise controlled by the electronic control device as a function of the information on the information carriers and/or by the central machine control of the print shop or bindery and in such a way that when a desired number of products for a job is reached, the pusher device associated with a stack is actuated while the transport belt feeds the conveyed products to the other product receiving space. To a certain extent, this allows print shop products to be buffered.

It is to be understood that a third, fourth, and further product receiving spaces/containers having a corresponding stop may be provided adjacent to the second product receiving space in addition to the at least two product receiving spaces, which are preferably embodied as product receiving containers that are closed on the sides but open to one side. This further product receiving space may be addressed by a translatory displacement of the second and third deflection rollers with the transport belt guided thereon. This provides the option of providing further buffering space if the transport belt conveys a product stream consisting of three or more different print shop products. In this case it is likewise possible to implement a sorting function by moving the second deflection roller back and forth between the two or more delivery positions while the transport belt continues to run, for example in order to feed print shop products that are produced at different times and different speeds in different upstream machines such as adhesive binders, thread sealing machines, saddle stitches etc. to a respective product receiving area/container. Since the product receiving containers that form the product receiving spaces may be arranged immediately adjacent to each other side by side, there are no gaps between stacks, resulting in a very compact design of the device.

In order to enable the sorting of different products that are being supplied when multiple product receiving spaces are in use without having to interrupt the product stream, the upstream processing machines that generate the product stream preferably create gaps between the individual products. These gaps are preferably big enough for the timing intervals defined for the respective transport speed of the product stream to be sufficient to move the second deflection roller with the transport belt wrapped around it to the desired delivery position.

Although the print shop products that are supplied by the transport belt are preferably book blocks or books, it is likewise possible to use the device of the invention to stack and collate other print shop products such as brochures or signatures, in particular print shop products that are created by one or more upstream digital printing machines.

Other features which are considered as characteristic for the invention are set forth in the appended claims.

Although the invention is illustrated and described herein as embodied in a device for delivering print shop products supplied in a product stream on two separate stacks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
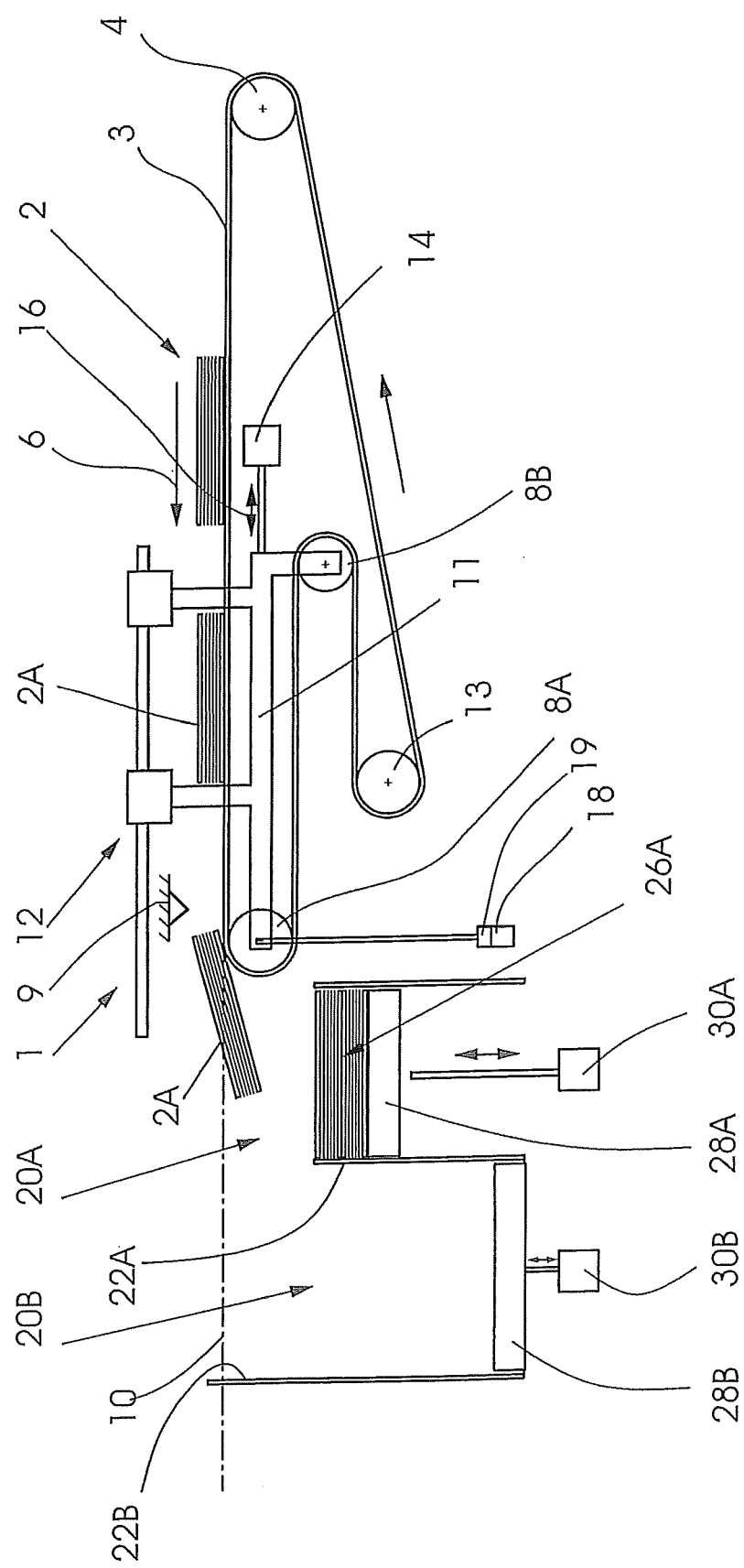
FIG. 1 is a diagrammatic side view of a first embodiment of a device according to the invention in which a second deflection roller is in a first delivery position to feed print shop products to a first product receiving space.

Referring now to the figures of the drawing in detail and first, particularly, to FIG. 1 thereof, there is shown a device 1 of the invention for delivering print shop products 2A, 2B, 2C supplied in a product stream 2 and contains an endlessly revolving transport belt 3 on which the print shop products 2A, 2B, 2C are deposited once they have been created by an upstream print shop machine such as a digital printing press or an adhesive binder, which is not illustrated in any detail herein.

The print shop products 2A, 2B, 2C have different formats, which are indicated by reference symbols 2A, 2B, 2C. Reference symbol 2A denotes a smaller format in FIG. 1, reference symbol 2B denotes the larger formats in FIG. 2, and reference symbol 2C denotes a further small format in FIG. 3.

Figure 2:
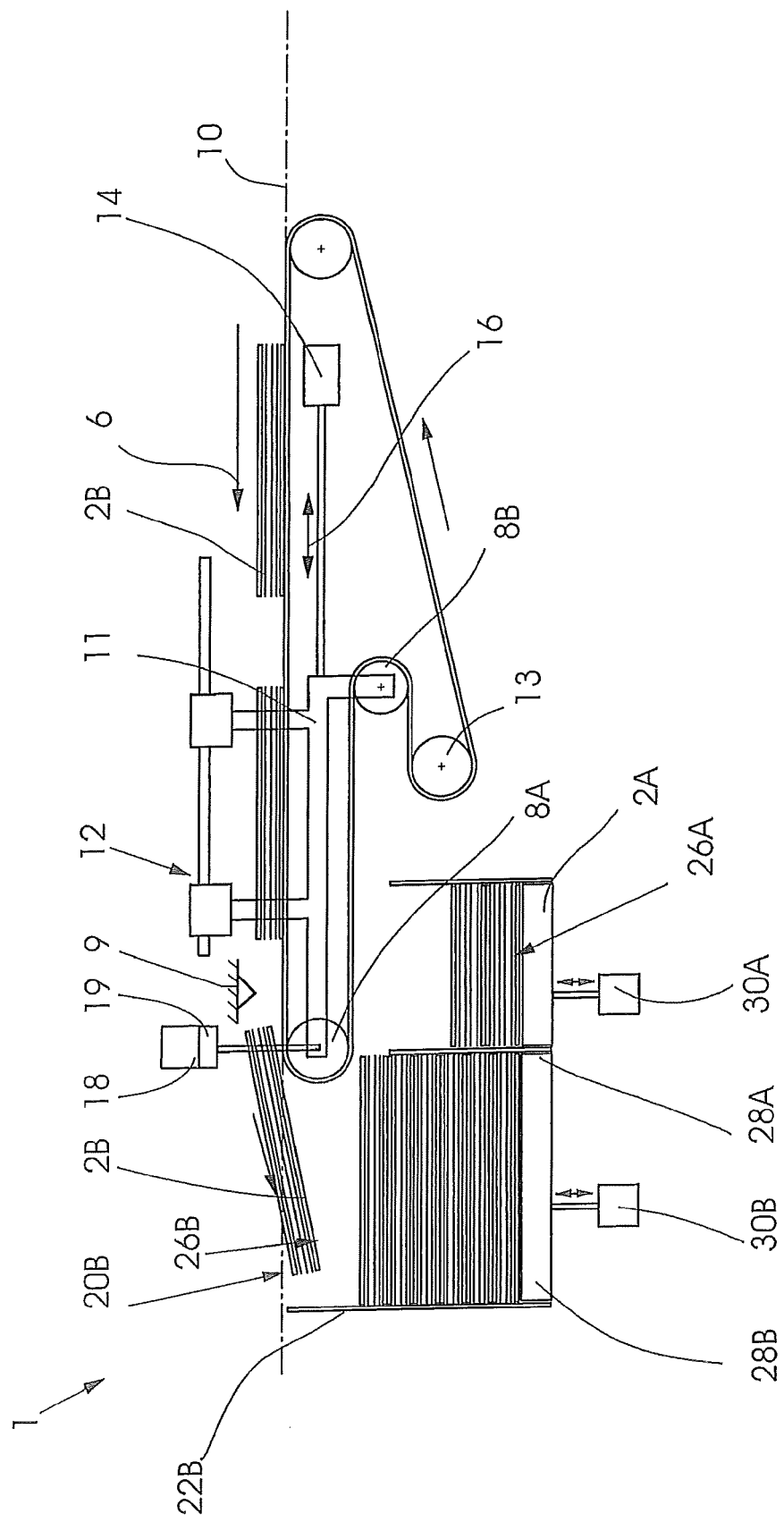
FIG. 2 is a diagrammatic side view of the embodiment shown in FIG. 1 with the second deflection roller with a transport belt guided thereon in a second delivery position to feed the print shop products to a second product receiving space.
Figure 3:
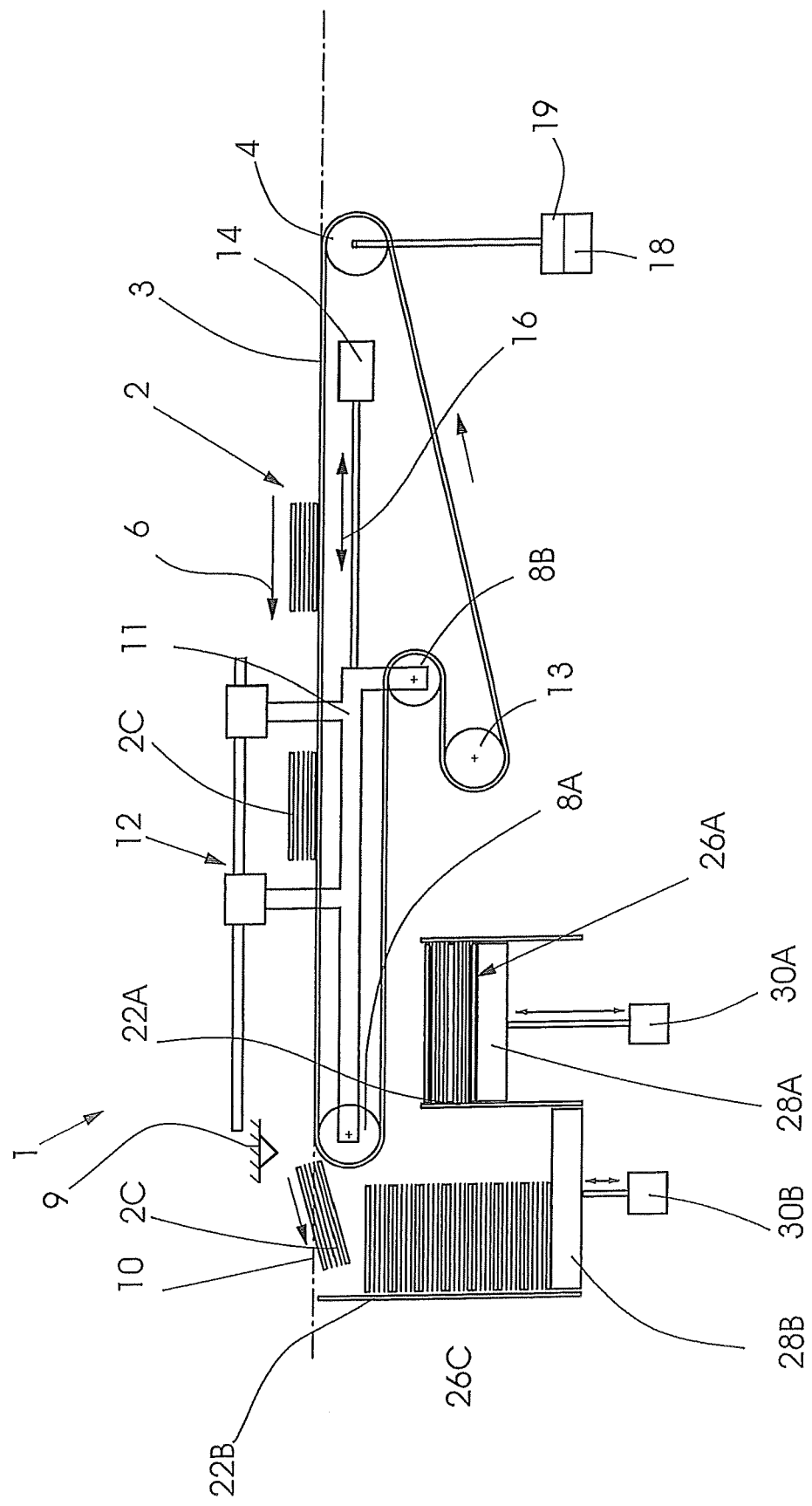
FIG. 3 is a diagrammatic side view of a second embodiment of the device.

As can be seen in detail from the representations shown in FIGS. 1, 2, and 3, the device 1 of the invention contains a first stationary deflection roller 4, which is preferably mounted to rotate freely in otherwise non-illustrated side walls. As viewed in the direction of movement (indicated by arrow 6) of the print shop products 2A, 2B, 2C, a second deflection roller 8A is arranged downstream of the first deflection roller 4 in a horizontal plane 10 defined by the upper side of the transport belt 3. Together with a third deflection roller 8B, the second deflection roller 8A is received in a frame 11, which is supported to be movable in the non-illustrated side walls of the device 1 by linear guides 12, which are only roughly indicated in the drawing. The frame 11 is coupled to an actuator 14, for example a hydraulic cylinder or a pneumatic cylinder or a stepping motor having a pulley and a timing belt. The actuator 14 displaces the frame 11 in a direction indicated by the double-headed arrow 16 in parallel with the horizontal plane 10 out of a first delivery position shown in FIG. 1 into a second delivery position shown in FIG. 2 and into a third delivery position shown in FIG. 3.

Below the third movable deflection roller 8B, a stationary fourth deflection roller 13 is supported to rotate freely between the side walls. As viewed in the horizontal direction, the fourth deflection roller 13 is located between the two rollers 8A and 8B and further guides the endless transport belt 3 before the latter returns to the first stationary deflection roller 4. Relative to the third deflection roller 8B, the fourth deflection roller 13 is arranged in such a way that the transport belt 3 runs horizontally between the two rollers 8B and 13, i.e. in parallel with plane 10. In accordance with the invention, this advantageously achieves that the tension in the transport belt 10 does not change when rollers 8A, 8B are displaced. The revolving transport belt 3 is driven by an electric drive motor 18, which is only diagrammatically shown in FIGS. 1 and 2 and is preferably embodied as a tubular motor located inside the second deflection roller 8A.

As it is further shown in FIG. 1, the device 1 of the invention further contains a first product receiving space in the shape of a first product receiving container 20A having a first stop 22A. The print shop products 2A come up against the first stop 22A with their leading edges, in the case of books or book blocks preferably with their book spines, when the transport belt 3 in the first delivery position conveys the print shop products 2A against the first stop 22A. The upper side of the first stop 22A, which is preferably part of that side wall of the first product receiving container 20A that is distal to the second deflection roller 8A, extends as far as shortly below the horizontal plane 10, and the distance between the first stop 22A and the second deflection roller 8A is slightly greater, for example by 2-5 cm, than the length of the supplied print shop products 2A.

To modify the height of a first stack 26A, a bottom 28A of the first product receiving container 20A is movable in a downward direction indicated by the double headed arrow (without reference symbol) by a first adjustment device, for example a hydraulic or pneumatic cylinder 30A to create a gap for introducing a next print shop product once a print shop product 2A has been introduced. The height of the gap essentially corresponds to the thickness of the print shop products 2A.

Referring now to FIG. 2 of the drawings, when print shop products 2B of a larger format are supplied, frame 11 is moved into the second delivery position by actuating the actuator 14. If the spacing between the print shop products 2B is sufficient, this is preferably done while the transport belt 3 continues to revolve. In this second delivery position shown in FIG. 2, the second deflection roller 8A is located close to the first stop 22A at a height at which the horizontal plane 10 is a short distance above the first stop and the print shop products 2B are conveyed past the first stop 22A into the second product receiving space. The second receiving space is a second product receiving container 20B whose bottom 28B is vertically movable via a second adjustment device to create a new gap for receiving a following product once a preceding print shop product 2B has been received.

Although only two product receiving containers 20A and 20B are shown in the exemplary embodiments, this is by no means to be understood to limit the invention in any way. It will be apparent to those skilled in the art that more than two product receiving containers may be provided.

FIG. 3 illustrates a further embodiment. The product receiving containers 20A and 20B are of equal size and are dimensioned to accommodate the maximum format of print shop products to be stacked. As shown in FIG. 3, a suitable actuation of the actuator 14 allows the second deflection roller 8A to be moved into a position that also allows print shop products 2C of a smaller format to be deposited and stacked in the respective product receiving container 20A and 20B (as illustrated in the FIG. 3). FIG. 3 further shows that it is not deflection roller 8A that is provided with a drive motor 18, but deflection roller 4. The motor 18 may alternatively be associated with deflection roller 13 since deflection roller 13 has the largest area of contact with the transport belt 3, an aspect which has a positive influence on the driving behavior.

Figure 4:
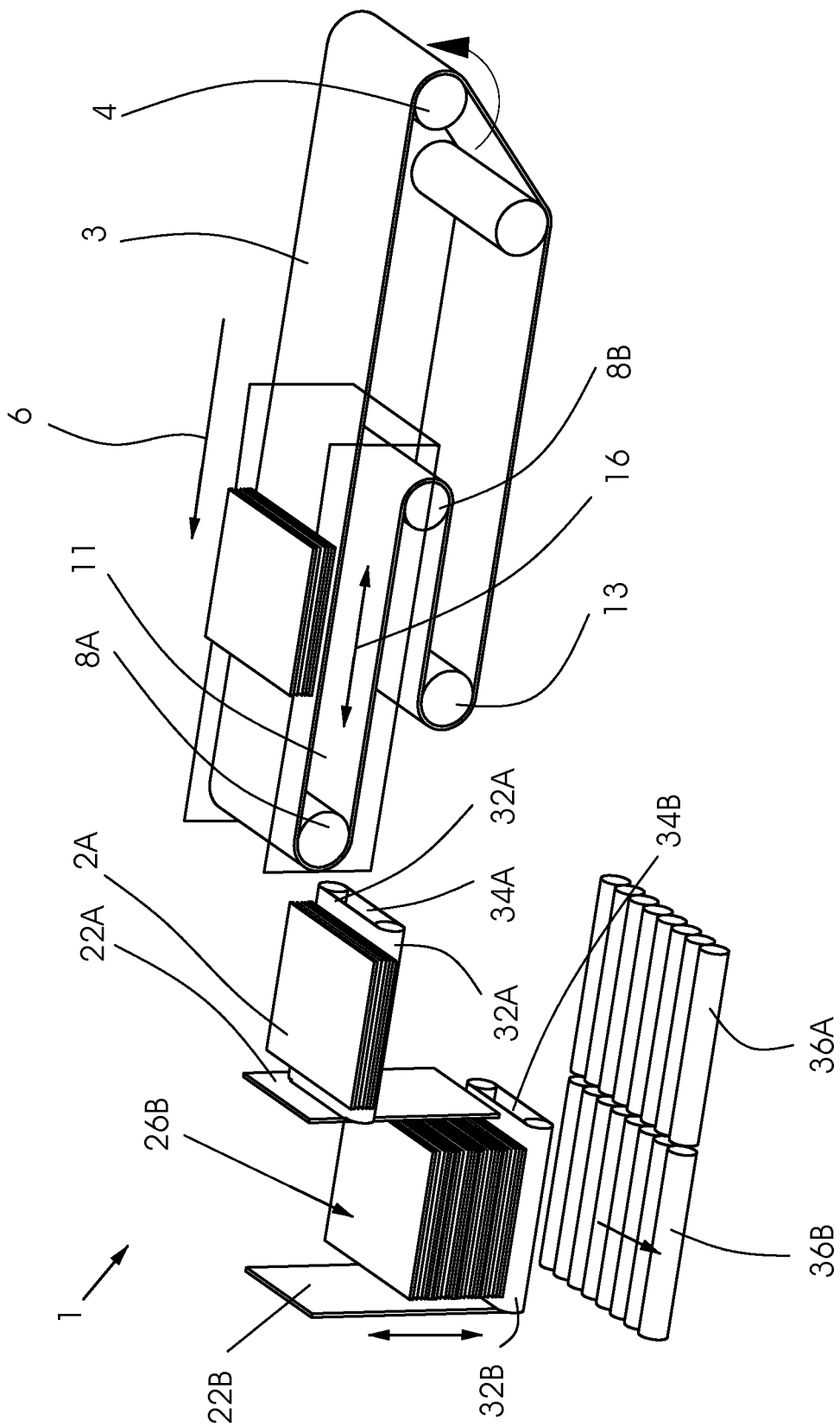
FIG. 4 is a diagrammatic three-dimensional representation of a third embodiment of the invention in which the bottoms of the product receiving spaces are embodied as stacking belts.

As shown in FIG. 4, the two bottoms of the first and second product receiving containers/spaces 20A, 20B may contain two rollers 32A and 32B that are arranged in a generally horizontal plane and guide an endless transport belt 34A, 34B. On the upper sides of the transport belts 34A, 34B the print shop products 2A, 2B introduced into the respective product receiving space 20A, 20B are deposited on stacks. At least one 32 of these rollers is drivable by a non-illustrated drive to move a stack 26A, 26B that has reached a desired height onto a roller track 36A, 36B as indicated in FIG. 4.

Figure 5:
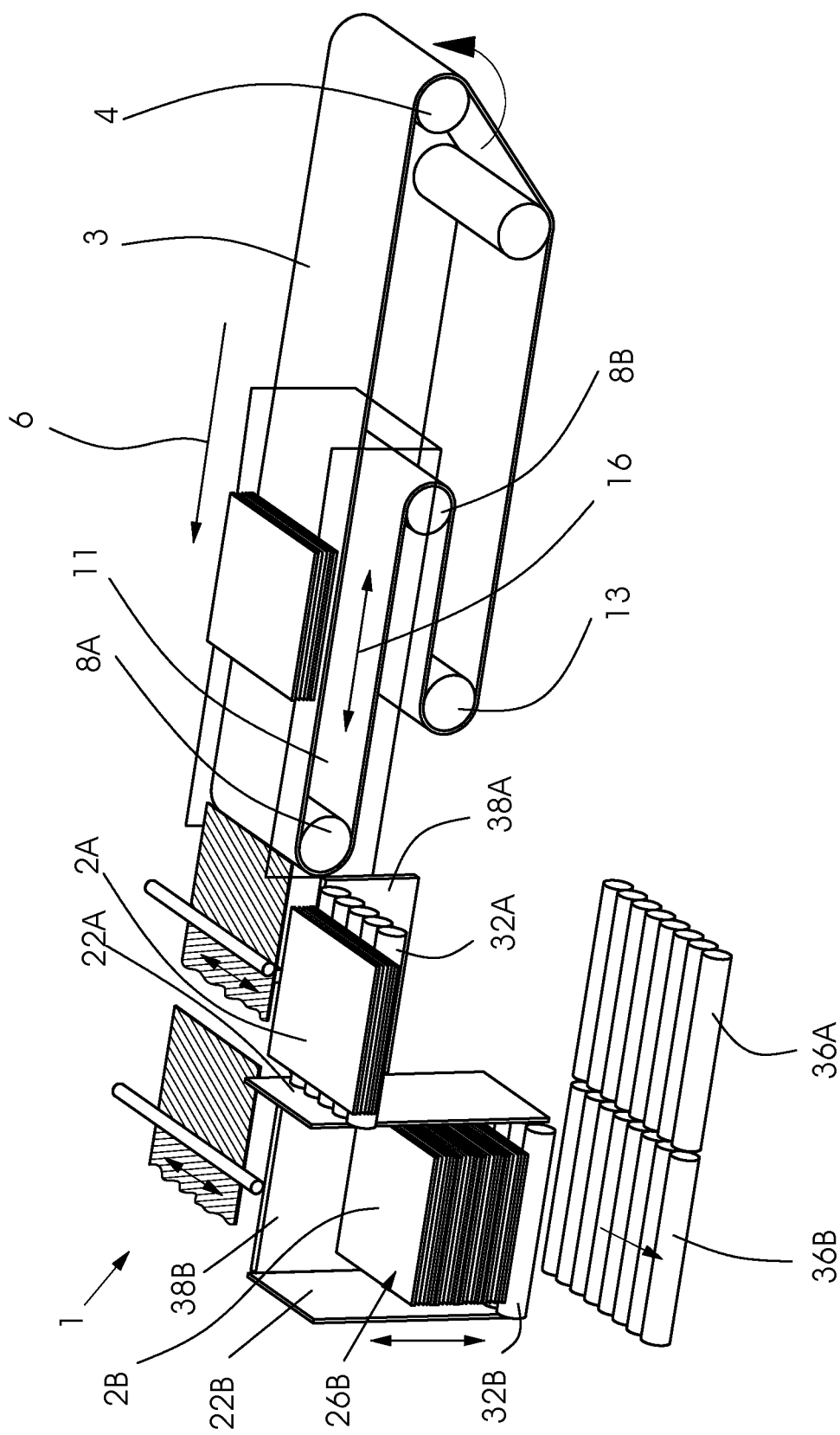
FIG. 5 a diagrammatic three-dimensional representation of a fourth embodiment of the invention in which the bottoms of the product receiving spaces are provided with rollers and the product stacks that have been created are pushed out by pusher devices.

Alternatively, the bottoms of the two product receiving spaces 20A, 20B may be embodied as roller bottoms as indicated in FIG. 5. A respective pusher device 38A, 38B shown in FIG. 5 may push the product stacks 26A, 26B from the respective roller bottom onto a roller track 36A, 36B. The actuator 14, the drive motor 18 for the transport belt 3, first and second adjustment devices 30A, 30B and preferably also the non-illustrated drives for actuating the pusher devices 38A, 38B or rollers 32A, 32B of the roller bottoms are preferably connected to an electronic control device (not shown in any detail in the figures) that controls the actuating and driving processes described above, potentially in closed-loop control. The electronic control device may be coupled to a sensor 9 that detects the presence of print shop products 2A, 2B, 2C and the type of print shop product conveyed on the transport belt 3 in particular in the region of the second deflection roller 8A.

In accordance with the invention, one of the movable deflection rollers 8A, 8B or one of the stationary deflection rollers 4, 13 is driven by the drive motor 18, in particular by an electric motor received within the roller and a reduction gearing 19 in order to drive the transport belt 3 that is guided by the roller.

The invention claimed is:

1. A device for delivering print shop products supplied in a product stream in at least two separate stacks, the device comprising:
    an endlessly revolving transport belt on which the print shop products are deposited;
    a stationary upstream upper first deflection roller;
    a movable downstream upper second deflection roller disposed in a generally horizontal plane with said first deflection roller;
    a third deflection roller disposed below said second deflection roller and jointly movable with said second deflection roller;
    a stationary fourth deflection roller disposed below said third deflection roller and guiding said transport belt;
    a first stop;
    a second stop;
    product receiving spaces including a first product receiving space having a bottom and a second product receiving space having a bottom;
    an actuator for jointly moving said second and third deflection rollers in parallel with the horizontal plane from a first delivery position, in which the print shop products are transported leading side first to said first stop disposed above said first product receiving space for a first stack, into a second delivery position, in which the print shop products are transported leading side first to said second stop disposed above said second product receiving space for a second stack;
    adjustment devices including a first adjustment device and a second adjustment device for changing a distance between said bottom of said first and second product receiving spaces and the horizontal plane; and
    an electronic control device that, after an introduction of a print shop product into one of said product receiving spaces, actuates one of said first and second adjustment devices in such a way that prior to the introduction of a next print shop product, said bottom of said one product receiving space is lowered by a distance that corresponds to a thickness of the next print shop product to be introduced, said electronic control device configured to:
        control a selection of a desired one of said product receiving spaces and a lowering of said bottom of a selected product receiving space;
        calculate a desired position of said second deflection roller in dependence on stored parameters of the print shop product;
        transmit data to said actuator, said actuator causing the desired position to be moved to;
        stack the print shop products in said selected product receiving space; and
        remove completed stacks of the print shop products from said selected product receiving space.

2. The device according to claim 1, further comprising:
a guide; and
a common frame, said second deflection roller and said third deflection roller are received on said common frame that is slidably guided in said guide fixed to said common frame.

3. The device according to claim 1, further comprising a drive motor, one of said movable second or third deflection rollers or one of said stationary first or fourth deflection rollers is driven by said drive motor.

4. The device according to claim 3, wherein said drive motor includes an electric motor received inside said second deflection roller and a reduction gearing to drive said endlessly revolving transport belt.

5. The device according to claim 1, wherein said bottom of said first product receiving space and/or said second product receiving space contains at least two bottom rollers and a respective further endless transport belt that is guided by said at least two bottom rollers disposed in a generally horizontal plane and having an upper side the print shop products introduced in said product receiving spaces are deposited on a stack.

6. The device according to claim 5, further comprising a drive motor causing the first and second stacks to be moved out, at least one of said two bottom rollers of said product receiving spaces is connected to said drive motor.

7. The device according to claim 1, wherein said bottom of said first product receiving space and/or said second product receiving space having a respective plurality of rollers that are disposed adjacent to each other in a plane and on whose upper side the print shop products introduced in said product receiving spaces are deposited on a stack.

8. The device according to claim 1, further comprising:
a further conveying device; and
driven pusher devices, one of said driven pusher devices assigned to each of said product receiving spaces for pushing the print shop products deposited on top of each other on a stack in said product receiving spaces in a direction generally perpendicular to a conveying direction of the product stream out of said product receiving spaces and onto said further conveying device.

9. The device according to claim 8, wherein said further conveying device is selected from the group consisting of an inclined roller track and a further revolving conveyor belt.

10. The device according to claim 1, wherein the print shop products are selected from the group consisting of book blocks and books.

11. A device for delivering print shop products supplied in a product stream in at least two separate stacks, the device comprising:
an endlessly revolving transport belt on which the print shop products are deposited;
a stationary upstream upper first deflection roller;
a movable downstream upper second deflection roller disposed in a generally horizontal plane with said first deflection roller;
a third deflection roller disposed below said second deflection roller and jointly movable with said second deflection roller;
a stationary fourth deflection roller disposed below said third deflection roller and guiding said transport belt;
a first stop;
a second stop;
product receiving spaces including a first product receiving space having a bottom and a second product receiving space having a bottom;
an actuator for jointly moving said second and third deflection rollers in parallel with the horizontal plane from a first delivery position, in which the print shop products are transported leading side first to said first stop disposed above said first product receiving space for a first stack, into a second delivery position, in which the print shop products are transported leading side first to said second stop disposed above said second product receiving space for a second stack;
adjustment devices including a first adjustment device and a second adjustment device for changing a distance between said bottom of said first and second product receiving spaces and the horizontal plane;
an electronic control device that, after an introduction of a print shop product into one of said product receiving spaces, actuates one of said first and second adjustment devices in such a way that prior to the introduction of a next print shop product, said bottom of said one product receiving space is lowered by a distance that corresponds to a thickness of the next print shop product to be introduced, said electronic control device configured to:
control a selection of a desired one of said product receiving spaces and a lowering of said bottom of a selected product receiving space;
calculate a desired position of said second deflection roller in dependence on stored parameters of the print shop product;
transmit data to said actuator, said actuator causing the desired position to be moved to;
stack the print shop products in said selected product receiving space; and
remove completed stacks of the print shop products from said selected product receiving space;
a sensor;
a memory; and
wherein said electronic control device is coupled to said sensor and/or said memory that detects and/or has saved a presence of the print shop products as well as a type of the print shop products conveyed on said endlessly revolving transport belt in a region of said second deflection roller and wherein said electronic control device actuates said actuator in dependence on signals of said sensors and/or said memory while said endlessly revolving transport belt continues to revolve, in order to jointly move said second and third deflection rollers from the first delivery position into the second delivery position and back while maintaining a generally unchanged tension in said endlessly revolving transport belt.

12. A method for delivering or stacking print shop products using the device according to claim 1, which comprises the steps of:
receiving the print shop products on the endlessly revolving transport belt from an upstream bookbindery machine;
calculating a desired position of the second deflection roller in dependence on stored parameters of the print shop product;
transmitting data to the actuator, which causes the desired position of the second deflection roller to be moved to;
stacking the print shop products in one of the product receiving spaces;
removing completed stacks; and
actuating one of the first and second adjustment devices in such a way that prior to an introduction of a print shop product, the bottom of the one product receiving space is lowered by a distance that corresponds to a thickness of the print shop product to be introduced.

13. The method according to claim 12, which comprises the steps of selecting the stored parameters from the group consisting of product format, product thickness, total number of products in a job, and number of products to be stacked per compartment.

* * * * *